Feb. 12, 1935.　　T. C. BROWNE ET AL　　1,991,009
PRINTING PLATE AND METHOD FOR FORMING THE SAME
Filed June 24, 1931
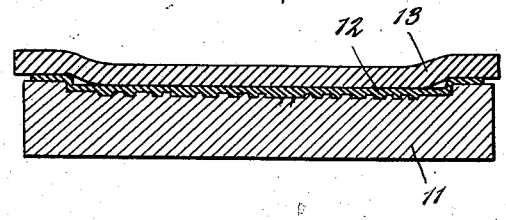
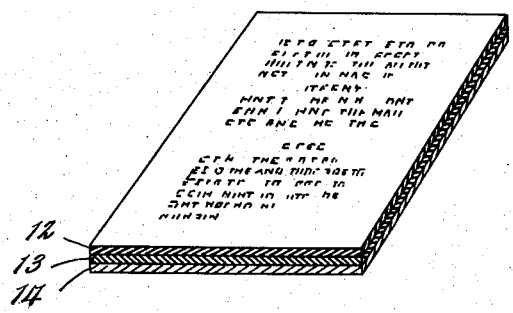
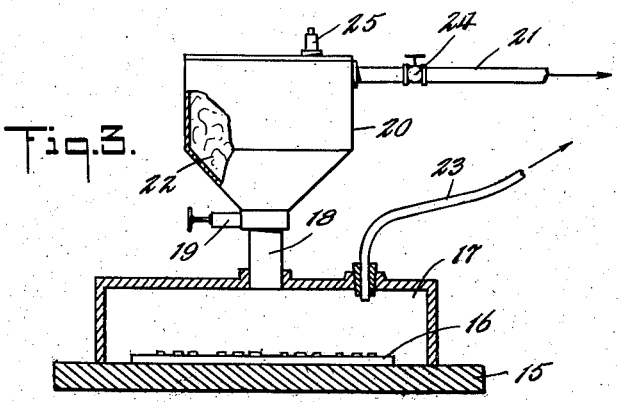
INVENTORS
Theodore C. Browne
Alfred C. Butsfield Patented Feb. 12, 1935

1,991,009

UNITED STATES PATENT OFFICE 1,991,009

PRINTING PLATE AND METHOD FOR FORMING THE SAME

Theodore C. Browne, Hinsdale, Ill., and Alfred C. Buttfield, North Plainfield, N. J.

Application June 24, 1931, Serial No. 546,456

12 Claims. (Cl. 18—59)

This invention relates to a method and means for forming rubber printing plates and other articles of rubber.

It has been proposed to form rubber stereotypes by vulcanizing rubber into or against the familiar paper stereotype mat and subsequently stripping the rubber from the mat. Fine work cannot be produced by this process, for it is found that there is a sharp limit below which satisfactory reproduction of a screen cannot be secured. Because a rubber plate gives to a letter-press many of the characteristics of an offset press such as the ability to use less and lighter inks and print on nearly every surface, there is every reason to produce rubber printing plates bearing as fine a screen or grain as the best graphic art demands.

In the present invention, printing plates are made from rubber which is initially dispersed in water, a process which secures great fidelity of reproduction, and, further, we dry the rubber coating as it is formed upon the matrix, which greatly expedites the entire process and avoids the shrinking, pulling and loss of detail which may occur when the drying operation is carried on as a separate step.

The objects of this invention are to form articles of rubber which, even in their initial stages of formation have very low water content; to reduce the manufacturing time previously necessary to form and to dry articles made from rubber solutions; to force the uncured stock abstracted from the solution against the matrix or form with considerable pressure; to produce rubber articles which duplicate the form with great fidelity; to produce a tough, dense, flexible printing surface; and to form upon that surface as fine a pattern as may be desired. These and other objects will become apparent as the specification proceeds, but it is understood that, following the statutory requirement, we have herein set forth the preferred form of our invention and that other modifications and forms of the invention may be devised and arranged.

Still other objects and advantages of our invention will be apparent from the specification. The features of novelty which we believe to be characteristic of our invention are set forth with particularity in the appended claims. Our invention itself, however, will best be understood by reference to the specification and accompanying drawing, in which Fig. 1 is a section through a matrix and partially completed printing plate in accordance with our invention;

Fig. 2 is a perspective view of the completed printing plate, and

Fig. 3 is a partial sectional view illustrating one of the early steps in the process of producing matrix in accordance with our invention.

While we shall present this invention as a method of manufacturing printing plates, the process is suitable to produce articles of rubber in almost any shape, even in large, flat sheets. The specific nature of the article to be produced governs, of course, and the slight variations in the procedure or apparatus made necessary by the desired product will become evident as the process is understood and as this specification proceeds.

An absorbent mould or form 11 is made of whatever is to be reproduced. To make a printing plate, type locked in a chase, a photoengraver's plate, or other material which is commonly received by an electrotyper and which we generally designate by the word "form" 16, is covered with liquid plaster.

An imperfect mould can only mean an imperfect result, and, although we have produced satisfactory matrices and moulds by following certain well known plaster casting procedures, the results are too erratic. Pits in the surface caused by air bubbles frequently appear.

We avoid this difficulty by mixing the powdered plaster with water from which much of the dissolved gas has been removed and then stirring the two together under a substantial vacuum. The air, trapped between the grains of powder, foams out. Casting is safe when all foaming has ceased and the plaster has settled back to a thick, viscous liquid. Stirring expedites the process.

Sticking of the plaster to the form is prevented by a parting medium. As will later appear, the surface condition of the matrix is of great importance, consequently, an ill-chosen parting medium may cause serious trouble. Nothing in the nature of an impervious membrane nor a water repellent substance should be used. A mild, neutral soap, however, we find satisfactory. It neither interferes with the absorption phenomena later relied upon, nor does it cause the latex to precipitate. We brush a 10% solution carefully over the form before the plaster is applied.

Commercial plasters vary greatly. We suggest, therefore, that the mutual proportions of water and plaster be determined by test for each lot of plaster used. The desideratum is to produce a mould which, when hardened and dried, will absorb all the water possible. Mechanical strength and density may be sacrificed, in part, to secure this end.

In casting printing plate matrices where a very perfect impression is necessary, it is even desirable to place the form on a circuit 15 in a vacuum box 17 and apply the plaster while the pressure is reduced. This is indicated in Fig. 3 in which 20 represents the hopper containing the plaster 22 ready to be cast, which flows onto the form through the conduit 18, which is provided with a valve 19. Pipes 21 and 23 may be connected to a suitable pump, not shown, for the purpose of maintaining the desired vacuum and valve 24 is indicated for the purpose of controlling the vacuum. 25 indicates any suitable mechanism for stirring the mixture. A clear impression of closed letters such as O, A, and P will then be secured. A mould so made is practically free from surface defects and varies from the original by but a microscopically small amount.

The form is removed from the cast when the plaster is sufficiently dry. It may then be left to air dry, but we prefer to expedite the process and to dry the cast thoroughly at a mild heat.

We shall use the term "latex" hereafter to denote a water dispersion of rubber (either the natural latex or artificial dispersions) and dispersions of other natural or artificial substances which behave in a similar manner and which may be coagulated or condensed to form a dense, flexible substance. We also use the word "solution" in the popular, not the scientific, sense and intend that water suspensions as well as true solutions shall be described by this general term.

A solution of latex is made up containing a curing agent, an eccelerator, and the common loading and protective substances usually found in rubber compounds. The particular formula is of importance only with regard to the use to which the rubber product will be put. If a printing plate is to be used with a greasy ink, a formula which will produce a grease resistant rubber should be chosen, but wide variations in the formulae have, substantially, no effect upon the process itself.

The plaster matrix is placed face-up on a table and a small dam placed around its edges. A scoopful of compounded latex is then poured over its surface. The plaster seizes the water from the latex and a tough, dense coat of compound is rapidly built on its surface. It will be obvious that any specific figures depend upon equally specific conditions viz. the type of the plaster, the dryness of the matrix, the kind of latex, etc., but we have secured coagulated coats of compound about one millimeter thick in five minutes.

When sufficient rubber has been built up upon the matrix, the remaining latex is poured off. The matrix could be dipped in a tank of latex, if desired. We prefer the process outlined because it obviates the necessity of waterproofing or protecting the rear surface and the sidewalls of the plaster. In a minute or two after the latex has been poured off, the characteristic appearance of a latex-wet surface is gone. Coagulation of the entire film has taken place. Subsequently water is expressed as syneresis takes place. The matrix with the layer of latex thereon will then have the appearance as diagrammatically indicated in Fig. 1, 11 being the form and 12 the layer of coagulated latex.

The process will come to an end when the matrix is saturated, but if its back be subjected to a substantial vacuum and the water vapor be removed by freezing or otherwise, saturation of the matrix can be prevented.

It is evident that the forces due to the "absorption" are high and full advantage is taken of them, for the rubber is driven into and duplicates (in reverse) the finest markings in the mould with the utmost fidelity.

Usually, and preferably, we compound a rubber accelerator of the "ultra" type with the latex because it makes the following procedure possible. A piece of properly compounded backing stock 13 is laid over the newly formed rubber plate. The matrix, stock, and plate are then clamped in a vulcanizing press which is set to form a printing plate of the requisite thickness, for example, eleven points. The cure now proceeds at a temperature below that necessary to form steam.

There are times when an "ultra" accelerator will impart an undesirable characteristic to the rubber. Then, if the cure is to progress at steam forming temperatures, it is highly desirable to dry the matrix thoroughly before attempting to cure the rubber, otherwise small blisters or pits due to steam may form in the printing surface. Alternatively, we may cure the plate in a pressure chest, raising the pressure to prevent the formation of steam, or we may use sulphur chloride or some equivalent cold-cure.

After curing, the rubber plate is stripped from the matrix which is thoroughly dried and is then ready for use again.

The plate may be affixed to any approved block in any suitable manner, as indicated in Fig. 2, in which 12 is the printing surface of the plate, 13 the backing stock and 14 the mounting block. Wooden blocks as used with electrotypes are reasonably satisfactory, but a preferable mounting is upon a metal block. This may be an adaptation of the metal base now commonly available for electrotypes, electroplated however, with a suitable metal to make bonding of the rubber plate possible. The ordinary basing metal alloy will bond to rubber only with great difficulty.

We may cure the latex, backing stock and bonding cement all in one operation. In that case, the electroplated face of the metal base covered with a bonding-to-metal type cement is laid upon the backing stock and the vulcanizing press is set to produce a type-high plate after the cure.

For the finest work, some correction in the printing surface level may be required. We do not apply the base initially in this case, but proof the plate first. If parts are too high, they are corrected by grinding down the back of the plate, or if too low, they may be built up by thin shims of rubber or dabs of cement.

Variants of the process may be as follows: A flong of paper is prepared and pressed over the form in the usual manner. Flongs as are now used in stereotype work are usable, but we have found it desirable to omit all clay and "loaders" from the paste and to substitute a fine, absorbent tissue for the "Italian" tissue usually placed upon the face of the flong. The absorption of the latter flong is much better.

When the impression has been made and dried according to the practice in stereotype plants, we pour compounded latex over the face of the mat. The procedure now follows that set out above except that the mat is laid upon a bed of quick setting cement to form a flat bearing to receive the pressure of the vulcanizing press.

The matrix may also be formed of fine wood flour or other pulverized absorbent matter. Wood flour, preferably passing 200 mesh, is mixed with a binding agent. If a waterproof binder be used, the mass should be damp only, not saturated with the binder, for it is advantageous to leave microscopic voids and absorption channels. Ordinary non-waterproof adhesives may be used.

The form is covered with some material such as graphite, talc, or soft soap to prevent sticking and the damp mass is forced into the form by an electrotyper's press or its equivalent. When the matrix is dried, it is covered with latex as before.

We have found it advantageous, when using certain matrices, to incorporate into the material of the matrix one or more of the recognized precipitating or coagulating agents for latex such as sodium acetate. Penetration of the rubber into the matrix itself is prevented by this expedient which also may increase the speed with which the rubber coating is formed.

The process reproduces a printing surface with exactitude and gives a tough, flexible, long wearing printing plate.

We claim:

1. That process of forming printing plates which includes making a matrix impression in plaster and covering the impression with latex, whereby a coating of rubber is formed upon the plaster surface.

2. That process of forming printing plates which comprises forming a matrix of a water absorbent material and covering that portion of the matrix which bears the impression with compounded latex, whereby water is extracted from the latex by the matrix and a coating of rubber is formed thereon.

3. The process of manufacturing a printing plate which includes forming an absorbent matrix for the plate, placing compounded latex in contact with the matrix, and subsequently curing the rubber deposited from the latex at a temperature below 212° F.

4. The process of manufacturing a rubber printing plate which includes extracting water from the compounded latex by means of the matrix, whereby a layer of rubber is built up upon the surface thereof, and subsequently curing the rubber so deposited while it is still in contact with the matrix.

5. That process of forming printing plates which includes forming a matrix of water absorbent material and covering that portion of the matrix which bears the impression with compounded latex, whereby water is extracted from the latex by the matrix and a coating of rubber is formed thereon, covering the deposited latex with a backing sheet of rubber, and then curing the latex facing and the backing sheet together to form a printing plate.

6. In a process for forming rubber printing plates, the steps which include forming a water absorptive mould having a coagulating agent for latex incorporated therein, and then collecting and coagulating upon the mould a layer of rubber by exposing the surface of the mould to a bath of compounded latex.

7. That process of forming a rubber printing plate which includes extracting liquid from latex into an absorptive matrix whereby a layer of rubber is formed thereon, and then curing the rubber in place upon the matrix under conditions of temperature and pressure which will prevent the formation of steam.

8. A process for forming a rubber printing plate which includes mixing a moulding composition and a liquid and treating under a vacuum to remove the entrapped air, forming an impression of the article to be duplicated in the moulding composition, and later collecting rubber from latex upon the surface of the mould so formed.

9. A printing plate comprising a facing of coagulated and then materially dehydrated latex rubber, a backing layer of sheet rubber, and a supporting base all so joined together as to form a unitary printing element.

10. A printing plate having its printing surface and a layer of material immediately adjacent thereto deposited in its final configuration from an aqueous dispersion of rubber which layer has been materially dehydrated during the process of its formation.

11. A printing plate having a working surface formed in place from a water dispersion of rubber, an intermediate layer of rubber, and an element providing substantial mechanical support.

12. The process of forming relief-bearing printing plates which includes the step of forming a coat of rubber against a surface which is capable of absorbing the suspending medium from a rubber dispersion.

THEODORE C. BROWNE.
ALFRED C. BUTTFIELD.